United States Patent
Rowland et al.

(10) Patent No.: US 6,232,410 B1
(45) Date of Patent: May 15, 2001

(54) ELASTOMERS WITH IMPROVED PROCESSABILITY

(75) Inventors: Michael E. Rowland; Che I. Kao, both of Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/140,575

(22) Filed: Aug. 26, 1998

Related U.S. Application Data

(60) Provisional application No. 60/057,086, filed on Aug. 27, 1997.

(51) Int. Cl.$^7$ ................................................. C08F 8/00
(52) U.S. Cl. .................. 525/387; 525/331.7; 525/332.8; 525/332.9
(58) Field of Search ............................................. 525/387

(56) References Cited

U.S. PATENT DOCUMENTS

| | | | |
|---|---|---|---|
| Re. 33,269 | 7/1990 | Thiersault et al. | 525/333.8 |
| 2,933,480 | 4/1960 | Gresham et al. | 260/80.5 |
| 3,063,973 | 11/1962 | Gladding et al. | 260/79.5 |
| 3,093,620 | 6/1963 | Gladding et al. | 260/79.5 |
| 3,407,158 * | 10/1968 | Guglielmino et al. | 525/387 |
| 3,909,463 | 9/1975 | Hartman | 260/2.5 F |

(List continued on next page.)

FOREIGN PATENT DOCUMENTS

| | | | |
|---|---|---|---|
| 1203948 | 5/1983 | (CA) | C08K/5/14 |
| 0 145 475 A2 | 6/1985 | (EP) | C08J/3/28 |
| 0 156 458 A1 | 10/1985 | (EP) . | |
| 0 520 732 A1 | 12/1990 | (EP) . | |
| 0 451 804 A2 | 10/1991 | (EP) | C08J/3/28 |
| 0 416 815 A2 | 3/1992 | (EP) . | |
| 0 497 590 A2 | 8/1992 | (EP) | C08F/110/06 |
| 0 514 828 A1 | 11/1992 | (EP) . | |
| 0 519 386 A1 | 12/1992 | (EP) | C08J/3/28 |
| 0 678 527 A2 | 10/1995 | (EP) | C08F/8/00 |
| 0 755 971 A2 | 1/1997 | (EP) . | |
| 0 765 908 A1 | 4/1997 | (EP) . | |
| 7203313 | 9/1972 | (FR) | C08F/27/00 |
| 1362476 | 8/1974 | (GB) | C08F/27/00 |
| 1984-6241 | 1/1984 | (JP) | C08L/23/04 |
| 85/04664 | 10/1985 | (WO) | C08F/8/50 |
| 93/04486 | 3/1993 | (WO) | H01B/3/44 |
| 93/13143 | 7/1993 | (WO) . | |
| 94/07930 | 4/1994 | (WO) | C08F/299/00 |
| 95/000683 | 1/1995 | (WO) . | |
| 96/31563 | 10/1996 | (WO) | C08L/23/26 |
| 97/26297 | 7/1997 | (WO) . | |
| 97/32922 | 12/1997 | (WO) | C08J/3/24 |

OTHER PUBLICATIONS

Basheer, R., Dole, N., *Radiation Chemisty of Linear Low–Density Polyethylene. I. Gel Formation and Unsaturation Effects*, 1983, pp. 949–956, Journal of Polymer Science: Polymer Physics Edition, vol. 21.

Bremner, T., Rudin, A., *Peroxide Modification of Linear Low–Density Polyethylene: A Comparison of Dialkyl Peroxides*, 1993, pp. 785–798, Journal of Applied Polymer Science, vol. 49.

Chum, S., *Effects of Vinyl Chain–Ends on the Melt Viscoelastic Properties of Radiation Crosslinked Polyethylene*, 1992, pp. 37–47, Journal of Plastic Film & Sheeting, vol. 8.

Kurian, P., et al., *Effect of Controlled Crosslinking on the Mechanical and Rheological Properties of HDPE/LLDPE Blends*, 1992, pp. 113–116, Eur. Polym. J., vol. 28, No. 1.

Michiels, D.J., *Advanced Performance Terpolymers for Blown Film Applications*, Aug. 1994, pp. 1–8, the 1994 TAPPI Polymers, Laminations and Coatings Conference, Nashville, Tennessee.

Phillips, P.J., et al., *Crosslinking of Homogenous Polyethlenes*, May 1–5, 1994, Society of Plastics Engineers Conference Proceedings, Vol. II.

Su, T.K., et al., *Chemical Modification of Linear Low Density Polyethylene*, 1987, pp. 1271–1275, ANTEC '87.

Suwanda, D., Balke, S., *The Reactive Extrusion of Polyethylene: Process Improvements for Initiator Dispersion*, 1990, pp. 1908–1911, ANTEC '90.

Kaminsky, Walter, et al., *Journal of Polymer Science: Polymer Chemistry Edition*, vol. 23, pp. 2151–2164.

(List continued on next page.)

*Primary Examiner*—Bernard Lipman

(57) ABSTRACT

A process for improving the green strength of ethylene/α-olefin/diene polymers is described comprising (A) selecting an ethylene/α-olefin/diene polymer having a Mooney viscosity at 125 C up to about 80 and a percent gel (% gel) up to about 30 percent and (B) partially crosslinking the ethylene/α-olefin/diene polymer selected in step (A) to make a modified ethylene/α-olefin/diene polymer satisfying the equations $MV \leq 100$ and $$W \leq \left(\frac{MS_2 - MS_1}{MS_1}\right)$$

wherein MV is the Mooney viscosity of the modified polymer, $MS_1$ is the melt strength in centiNewtons of the polymer selected in step (A) at 110 C, when formulated according to ASTM D3568#2, $MS_2$ is the melt strength in centiNewtons of the modified polymer produced by step (B) measured under the same conditions, and W is 0.3. Modified ethylene/α-olefin/diene polymers obtainable according to the above process or satisfying the equation:

$$MS_2 \geq \left(\frac{MV}{X} + \frac{\% \text{ gel}}{Y}\right) Z$$

is also described in which $MS_2$, MV and % gel of the modified polymer are defined as defined above, X is 50, Y is 20, and Z is 40. Further described is a process for making an article comprising an ethylene/α-olefin/diene polymer and intermediates for making the modified ethylene/α-olefin/diene polymers.

10 Claims, No Drawings

U.S. PATENT DOCUMENTS

| | | | |
|---|---|---|---|
| 3,914,342 | 10/1975 | Mitchell | 260/897 |
| 3,953,655 | 4/1976 | Steinkamp et al. | 428/474 |
| 4,103,077 | 7/1978 | O'Mahoney, Jr. | 526/51 |
| 4,166,016 | 8/1979 | Paulsen | 204/159.14 |
| 4,460,750 | 7/1984 | Thiersault et al. | 525/333.8 |
| 4,525,257 | 6/1985 | Kurtz et al. | 204/159.2 |
| 4,578,431 | 3/1986 | Shaw et al. | 525/387 |
| 4,598,128 | 7/1986 | Randall et al. | 525/240 |
| 4,722,973 | 2/1988 | Yamaoka et al. | 525/240 |
| 4,737,547 | 4/1988 | White | 525/193 |
| 5,001,205 | 3/1991 | Hoel | 526/128 |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,091,352 | 2/1992 | Kioka et al. | 502/103 |
| 5,096,867 | 3/1992 | Canich | 502/103 |
| 5,132,380 | 7/1992 | Stevens et al. | 526/126 |
| 5,153,157 | 10/1992 | Hlatky et al. | 502/117 |
| 5,183,867 | 2/1993 | Welborn, Jr. | 526/114 |
| 5,198,401 | 3/1993 | Turner et al. | 502/155 |
| 5,229,478 | 7/1993 | Floyd et al. | 526/160 |
| 5,231,106 | 7/1993 | Knutsen et al. | 514/340 |
| 5,272,236 | 12/1993 | Lai et al. | 526/348.5 |
| 5,278,119 | 1/1994 | Turner et al. | 502/155 |
| 5,278,272 | 1/1994 | Lai et al. | 526/348.5 |
| 5,296,433 | 3/1994 | Siedle et al. | 502/117 |
| 5,321,106 | 6/1994 | LaPointe | 526/126 |
| 5,346,963 | 9/1994 | Hughes et al. | 525/285 |
| 5,374,696 | 12/1994 | Rosen et al. | 526/126 |
| 5,407,884 | 4/1995 | Turner et al. | 502/155 |
| 5,407,989 | 4/1995 | Davis et al. | 524/405 |
| 5,453,410 | 9/1995 | Kolthammer et al. | 502/155 |
| 5,470,993 | 11/1995 | Devore et al. | 556/11 |
| 5,483,014 | 1/1996 | Turner et al. | 526/113 |
| 5,486,632 | 1/1996 | Devore et al. | 556/11 |
| 5,491,246 | 2/1996 | Rosen et al. | 556/7 |
| 5,550,236 | 8/1996 | Schlosser et al. | 544/238 |
| 5,578,682 | 11/1996 | White | 525/282 |
| 5,625,087 | 4/1997 | Devore et al. | 556/468 |
| 5,733,983 * | 3/1998 | Hakuta et al. | 525/387 |
| 5,736,618 | 4/1998 | Poloso | 525/387 |

OTHER PUBLICATIONS

Lambert, Joseph B., et al., *J. Chem. Soc. Chem. Commun.*, 1993, pp. 383 and 384.

Lambert, Joseph B., et al., *Organometallics*, 1994, 13, pp. 2430–2443.

Williams, T., et al., *Polymer Letters*, 1968, vol. 6, 621–624.

Suwanda, D., Balke, S., *The Reactive Modification of Polyethylene. 1: The Effect of Low Initatior Concentrations on Molecular Properties*, Dec. 1993, pp. 1585–1591, Polymer Engineering Science. vol/ 33, No 24.

* cited by examiner

ELASTOMERS WITH IMPROVED PROCESSABILITY

CROSS REFERENCE TO RELATED APPLICATIONS

This application claims the benefit of U.S. Provisional Application No. 60/057,086 filed Aug. 27, 1997, the disclosure of which is incorporated herein by reference.

BACKGROUND OF THE INVENTION:

1. Field of the Invention

This invention relates to processes for modifying elastomers, the modified elastomers made thereby, and processes for making products from the modified elastomers.

2. Background Information

The term "elastomer" was first defined in 1940 to mean synthetic thermosetting high polymers having properties similar to those of vulcanized natural rubber, e.g. having the ability to be stretched to at least twice their original length and to retract very rapidly to approximately their original length when released. Representative of these "high polymers" were styrene-butadiene copolymer, polychloroprene, nitrite butyl rubber and ethylene-propylene polymers (aka EP and EPDM elastomers). The term "elastomer" was later extended to include uncrosslinked thermoplastic polyolefins, i.e. TPOs.

ASTM D 1566 defines various physical properties of elastomers, and the test methods for measuring these properties. U.S. Pat. No. 5,001,205 provides an overview of known elastomers comprising ethylene copolymerized with an α-olefin. As described therein, commercially viable elastomers have various minimum properties, e.g. a Mooney viscosity no less than 10, a weight average molecular weight ($M_w$) no less than 110,000, a glass transition temperature below −20° C., and a degree of crystallinity no greater than 25%.

A dilemma faced in the production of commercially viable cured elastomers is that a high weight average molecular weight is generally desired to improve physical properties such as tensile strength, toughness, compression set, etc., in the cured product, but the uncured high molecular weight elastomers are more difficult to process than their lower molecular weight counterparts. In particular, the uncured higher molecular weight uncured elastomers are typically more difficult it is to isolate from solvents and residual monomer following polymerization of the elastomer. The uncured higher molecular weight elastomers are also typically more difficult to extrude at high rates, since they are generally prone to shear fracture at lower extrusion rates and require more power consumption by polymer processing equipment such as batch mixers, continuous mixers, extruders, etc., and cause increased wear on the parts of such equipment exposed to high shear stresses, such as expensive extruder components. These disadvantages reduce production rates and/or increase the cost of production.

A conventional approach for resolving this dilemma is to make a relatively low molecular weight elastomer and then fully crosslink the final product to obtain the desired tensile strength, toughness, compression set, etc. A disadvantage of that approach is that the low molecular weight of the elastomer also generally corresponds to a low "green strength" (i.e., strength prior to crosslinking). That disadvantage is particularly noticeable in applications such as coating wire and cable, continuous extrusion of gaskets, etc., where low green strength results in sags or uneven polymer thickness. The present invention addresses these and other disadvantages.

SUMMARY OF THE INVENTION

This invention provides a process for improving the green strength of ethylene/α-olefin/diene polymers comprising:

(A) selecting an ethylene/α-olefin/diene polymer having a Mooney ML1+4 viscosity, measured according to ASTM D 1646 at 125 C, up to about 80 and a percent gel (% gel), measured according to ASTM D2765, Procedure A, up to about 30 percent and (B) partially crosslinking the ethylene/α-olefin/diene polymer selected in step (A) to make a modified ethylene/α-olefin/diene polymer satisfying the following equations:

$$W \leq \left(\frac{MS_2 - MS_1}{MS_1}\right)$$

wherein MV is the Mooney viscosity of the modified polymer measured as defined above, $MS_1$ is the melt strength in centiNewtons of the polymer selected in step (A) at 110 C, when formulated according to ASTM D3568#2, $MS_2$ is the melt strength in centiNewtons of the modified polymer produced by step (B) measured under the same conditions, and W is 0.3.

Another aspect of this invention is the modified ethylene/α-olefin/diene polymers obtainable according to the above process, preferably when they satisfy the equation:

$$MS_2 \geq \left(\frac{MV}{X} + \frac{\% \text{ gel}}{Y}\right) Z$$

in which $MS_2$, MV and % gel of the modified polymer are measured as defined above, X is 50, Y is 20, and Z is 40.

This invention also provides a process for making an article comprising an ethylene/α-olefin/diene polymer comprising:

(A1) melt processing the modified polymer described above;

(B1) forming the product of step (A1) into a shape; and (C1) curing the product of step (B1) to form an article comprising a crosslinked ethylene/α-olefin/diene polymer.

This invention also provides intermediates for making modified ethylene/α-olefin/diene polymers according to the above process comprising a polymer selected according to step (A) in combination with unreacted peroxide crosslinking agent in an amount appropriate to modify the selected polymer according to that process under melt processing conditions.

This invention also provides another process for making an article comprising an ethylene/α-olefin/diene polymer comprising:

(A1) melt processing the above intermediate;

(B1) forming the product of step (A1) into a shape; and (C1) curing the product of step (B1) to form an article comprising a crosslinked ethylene/α-olefin/diene polymer.

DETAILED DESCRIPTION OF THE INVENTION

Unless indicated to the contrary, all parts, percentages and ratios are by weight. The expression "up to" when used to specify a numerical range includes any value less than or equal to the numerical value which follows this expression. The expression "wt %" means "weight percent".

The term "crosslinking" as used herein refers to both tetrafunctional (H-type) long chain branching resulting from a covalent linkage between two polymer molecule backbones and trifunctional (T-type) long chain branching produced when a terminal group of a polymer molecule forms a covalent linkage with the backbone of another polymer molecule.

The term "gel" refers to a three-dimensional polymer network which is formed from covalently linked polymer chains. The amount of gel is expressed in terms of weight-percent based on the total weight of the polymer as determined by ASTM D2765, Procedure A.

The term "melt strength" refers to the strength of the elastomer measured in centiNewtons at 110 C when it is formulated according to ASTM D3568#2 according to a procedure described in more detail in the examples below.

Unless specified otherwise, the term "Mooney viscosity" as used herein means viscosity which is measured according to ASTM D1646, incorporated herein by reference, using a sheer rheometer at 125 C and measured according to ML 1+4.

The ethylene/α-olefin/diene polymers used to make rheology-modified polymers according to this invention are polymers of ethylene ($CH_2=CH_2$) with at least one aliphatic $C_3$–$C_{20}$ α-olefin and at least one $C_4$–$C_{20}$ diene. The diene ay be conjugated or nonconjugated.

Examples of the aliphatic $C_3$–$C_{20}$ α-olefins include propene, 1-butene, 4-methyl-1-pentene, 1-hexene, 1-octene, 1-decene, 1-dodecene, 1-tetradecene, 1-hexadecene, 1-octadecene and 1-eicosene. The α-olefin can also contain a cyclic structure such as cyclohexane or cyclopentane, resulting in an α-olefin such as 3-cyclohexyl-1-propene (allylcyclohexane) and vinyl-cyclohexane.

Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene, and the like; cyclic dienes such as 1,4-cyclohexadiene, bicyclo[2.2.1]hept-2,5-diene, 5-ethylidene-2-norbornene (ENB), 5-methylene-2-norbornene, 5-vinyl-2-norbornene, bicyclo[2.2.2]oct-2,5-diene, 4-vinylcyclohex-I-ene, bicyclo[2.2.2]oct2,6-diene, 1,7,7-trimethylbicyclo-[2.2.1]hept-2,5-diene, dicyclopentadiene, ethyltetrahydroindene, 5-allylbicyclo[2.2.1]hept-2-ene, 1,5-cyclooctadiene, and the like; aromatic dienes such as 1,4-dial lylbenzene, 4-allyl-1H-indene; and trienes such as 2,3-diisopropenylidiene-5-norbornene, 2-ethylidene-3-isopropylidene5-norbornene, 2-propenyl-2,5-norbornadiene, 1,3,7-octatriene, 1,4,9-decatriene, and the like; with 5-ethylidene-2-norbornene a preferred nonconjugated diene.

Examples of conjugated dienes include butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1, 3, 4-methylpentadiene-1,3, 1,3-pentadiene ($CH_3CH=CH—CH=CH_2$; commonly called piperylene), 3-methyl1,3-pentadiene, 2,4-dimethyl-1,3-pentadiene, 3-ethyl-1,3-pentadiene, and the like; with 1,3-pentadiene a preferred conjugated diene.

Exemplary polymers include ethylene/propylene/-5-ethylidene-2-norbornene, ethylene/1-octene/5-ethylidene-2-norbornene, ethylene/-propylene/1,3-pentadiene, and ethylene/1-octene/1,3-pentadiene. Exemplary tetrapolymers include ethylene/propylene/I-octene/diene (e.g. ENB) and ethylene/propylene/mixed dienes, e.g. ethylene/propylene/5-ethylidene-2-norbornene/piperylene. In addition, the elastomers can include minor amounts, e.g. 0.05–0.5 percent by weight, of long chain branch enhancers, such as 2,5-norbomadiene (aka bicyclo[2,2,1]hepta-2,5-diene), diallylbenzene, 1,7-octadiene ($H_2C=CH(CH_2)_4CH=CH_2$), and 1,9-decadiene ($H_2C=CH(CH_2)_6CH=CH_2$).

At a general minimum, the selected ethylene/α-olefin/diene polymers are derived from at least about 30, preferably at least about 40 and more preferably at least about 50, weight percent ethylene; at least about 15, preferably at least about 20 and more preferably at least about 25, weight percent of at least one α-olefin; and preferably at least about 0.1, and more preferably at least about 0.5, weight percent of at least one conjugated or nonconjugated diene. At a general maximum, the ethylene/α-olefin/diene polymers selected for modification according to this invention comprise not more than about 85, preferably not more than about 80 and more preferably not more than about 75, weight percent ethylene; not more than about 70, preferably not more than about 60 and more preferably not more than about 55, weight percent of at least one α-olefin; and not more than about 20, preferably not more than about 15 and more preferably not more than about 12, weight percent of at least one of a conjugated or nonconjugated diene. All weight percentages are based on weight of the elastomer which can be determined using any conventional method.

The polydispersity (molecular weight distribution or Mw/Mn) of the selected polymer prior to modification generally ranges from about 1.5, preferably about 1.8, and especially about 2.0, to about 15, preferably about 10, and especially about 6.

Molecular Weight Distribution Determination

The whole interpolymer product samples and the individual interpolymer components are analyzed by gel permeation chromatography (GPC) on a Waters 150 C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 100 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a*(M_{polystyrene})^b.$$

In this equation, a=0.4316 and b=1.0. Weight average molecular weight, $M_w$, and number average molecular weight, $M_n$, is calculated in the usual manner according to the following formula:

$$M_j = (\Sigma w_i(M_i)^j)^j;$$

where $w_i$ is the weight fraction of the molecules with molecular weight $M_i$ eluting from the GPC column in fraction i and j=1 when calculating $M_w$ and j=−1 when calculating $M_n$.

Generally the Mw of the interpolymer elastomers ranges from about 10,000, preferably about 20,000, more preferably about 40,000, and especially about 60,000 to about 1,000,000, preferably about 800,000, more preferably about 600,000, and especially about 500,000.

The polymers selected for modification cover a range of viscosities, depending upon their molecular weight. The Mooney viscosity for the selected polymers prior to modification according to this invention preferably ranges from a minimum of about 1, more preferably at least about 5, even more preferably at least about 10, and especially at least about 15, up to a maximum of about 80, more preferably up to about 65, even more preferably up to about 55, and especially up to about 45.

The density of the elastomers is measured according to ASTM D-792, incorporated herein by reference, and these densities range from a minimum of about 0.850 grams/cubic centimeter ($g/cm^3$), preferably about 0.853 $g/cm^3$, and especially about 0.855 $g/cm^3$, to a maximum of about 0.895 $g/cm^3$, preferably about 0.885 $g/cm^3$, and especially about 0.875 $g/cm^3$.

The polymers selected for modification have a percent gel (% gel), measured according to ASTM D2765, Procedure A, up to about 30, preferably up to about 20, more preferably up to about 10 and even more preferably up to about 5, percent.

The ethylene/α-olefin/diene polymer may be selected from any of those known in the art and/or commercially available, including those that are heterogeneously branched, such as those produced using Ziegler-Natta type catalysts, and those that are homogeneously branched. Examples include ethylene/α-olefin/diene polymers available from DuPont Dow Elastomers L.L.C., such as NORDEL® and NORDEL® IP, for instance NORDEL® 1040 and NORDEL® 1070 (each a 5 wt % ethylene, 44 wt % proplyene, and 3 wt % 1,4-hexadiene (HD) derived EPDM), and those available from Exxon under the name VISTALON™, for instance VISTALON™ 2504 (a 50 wt % ethylene, 45 wt % propylene and 5 wt % ethylidene norbornene (ENB) derived EPDM). The NORDEL® elastomers and how to make them are described for example in U.S. Pat. Nos. 2,933,480; 3,063,973; and 3,093,620, each of which are incorporated herein by reference.

In a preferred embodiment, the selected ethylene/α-olefin/diene polymer is homogeneously branched. In one such preferred embodiment, the selected polymer is obtainable by (1) contacting in a reactor (a) ethylene, (b) at least one $C_3$–$C_{20}$ aliphatic α-olefin, (c) at least one $C_4$–$C_{20}$ diene, (d) a catalyst, the catalyst comprising (i) a metallocene complex or single site catalyst and (ii) at least one activator, and (e) a diluent and (2) isolating the polymer product. These include, for example, the NORDEL® IP elastomers from DuPont Dow Elastomers L.L.C.

The metallocene complexes (or single site catalysts) and methods for their preparation are disclosed in EP-A-416,815 and EP-A-514,828 as well as in U.S. Pat. Nos. 5,470,993, 5,374,696, 5,231,106, 5,055,438, 5,057,475, 5,091,352, 5,096,867, 5,064,802, 5,132,380, 5,153,157, 5,183,867, 5,198,401, 5,272,236, 5,278,272, 5,321,106, 5,470,993, and 5,486,632, each of which is incorporated herein by reference. Particularly preferred among the single site catalysts are the Dow INSITE™ technology constrained geometry catalysts.

In EP-A-514,828, certain borane derivatives of the foregoing metallocene complex catalysts are disclosed and a method for their preparation taught and claimed in U.S. Pat. No. 5,453,410 combinations of cationic metallocene complex catalysts with an alumoxane were disclosed as suitable olefin polymerization catalysts.

For the teachings contained therein, the aforementioned U.S. Patents and published European Patent Applications are hereby incorporated by reference for their relevant disclosures.

Preferred catalyst compositions comprise:

a1) a metal complex corresponding to the formula: $ZLMX_pX'_q$. that has been or subsequently is rendered catalytically active by combination with an activating cocatalyst or by use of an activating technique, wherein M is a metal of Group 4 of the Periodic Table of the Elements having an oxidation state of +2, +3 or +4, bound in an $\eta^5$ bonding mode to L;

L is a cyclopentadienyl-, indenyl-, tetrahydroindenyl-, fluorenyl-, tetrahydrofluorenyl-, or octahydrofluorenyl-group covalently substituted with at least a divalent moiety, Z. and L further may be substituted with from 1 to 8 substituents independently selected from the group consisting of hydrocarbyl, halo, halohydrocarbyl, hydrocarbyloxy, dihydrocarbylamine, dihydrocarbylphosphino or silyl groups containing up to 20 nonhydrogen atoms;

Z is a divalent moiety bound to both L and M via cy-bonds, said Z comprising boron, or a member of Group 14 of the Periodic Table of the Elements, and optionally, also comprising nitrogen, phosphorus, sulfur or oxygen;

X is an anionic or dianionic ligand group having up to 60 atoms exclusive of the class of ligands that are cyclic, delocalized, π-bound ligand groups;

X' independently each occurrence is a neutral Lewis base ligating compounding, having up to 20 atoms;

p is 0, 1 or 2, and is two less than the formal oxidation state of M, with the proviso that when X is a dianionic ligand group, p is 1; and q is 0, 1 or 2; said metal complex being rendered catalytically active by combination with an activating cocatalyst or use of an activating technique; or a catalyst composition comprising a cationic complex a2) corresponding to the formula $(ZLM^*X^*_{p^*})^*A^-$, wherein: M* is a metal of Group 4 of the Periodic Table of the Elements having an oxidation state of +3 or +4, bound in an $\eta^5$ bonding mode to L;

L is a cyclopentadienyl-, indenyl-, tetrahydroindenyl-, fluorenyl-, tetrahydrofluorenyl-, or octahydrofluorenyl-group covalently substituted with at least a divalent moiety, Z. and L further may be substituted with from 1 to 8 substituents independently selected from the group consisting of hydrocarbyl, halo, halohydrocarbyl, hydrocarbyloxy, dihydrocarbylamino, dihydrocarbylphosphino or silyl groups containing up to 20 nonhydrogen atoms;

Z is a divalent moiety bound to both L and M* via σ-bonds, said Z comprising boron, or a member of Group 14 of the Periodic Table of the Elements, and also optionally comprising nitrogen, phosphorus, sulfur or oxygen;

X* is an anionic ligand group having up to 60 atoms exclusive of the class of ligands that are cyclic, delocalized, π-bound ligand groups;

p* is 0 or 1, and is three less than the formal oxidation state of M; and

A⁻ is an inert, noncoordinating anion.

Preferred X' and X* groups when M is a metal of Group 4 of the Periodic Table of Elements and has an oxidation state of +3 or +4 are alkyl, aryl, silyl, germyl, aryloxy, or alkoxy group having up to 20 non-hydrogen atoms. Additional compounds include phosphines, especially trimethylphosphine, triethylphosphine, triphenylphosphine and bis(1,2-dimethylphosphino)ethane, $P(OR)_3$; ethers, especially tetrahydrofuran; amines, especially pyridine, bipyridine, tetramethylethylenediamine (TMEDA), and triethylamine; olefins, and conjugated dienes having from 4 to 40 carbon atoms. Complexes including the latter X' groups include those wherein the metal is in the +2 formal oxidation state.

All references to the Periodic Table of the Elements herein shall refer to the Periodic Table of the Elements, published and copyrighted by CRC Press, Inc., 1989. Also, any references to a Group or Groups shall be to the Group or Groups as reflected in this Periodic Table of the Elements using the IUPAC system for numbering groups.

Zwitterionic complexes result from activation of a Group 4 metal diene complex, that is, complexes in the form of a metallocyclopentene wherein the metal is in the +4 formal oxidation state, by the use of a Lewis acid activating cocatalyst, especially tris(perfluoroaryl)borane compounds. These zwitterionic complexes are believed to correspond to the formula:

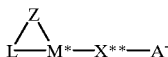

wherein:
M* is a Group 4 metal in the +4 formal oxidation state;
L and Z are as previously defined;
X** is the divalent remnant of the conjugated diene, X', formed by ring opening at one of the carbon to metal bonds of a metallocyclopentene; and
$A^{31}$ is the moiety derived from the activating cocatalyst.

As used herein, the recitation "noncoordinating, compatible anion" means an anion which either does not coordinate to component a 1) or which is only weakly coordinated therewith remaining sufficiently labile to be displayed by a neutral Lewis base. A non-coordinating, compatible anion specifically refers to a compatible anion which when functioning as a charge balancing anion in the catalyst system of this invention, does not transfer an anionic substituent or fragment thereof to said cation thereby forming a neutral four coordinate metallocene and a neutral metal byproduct. "Compatible anions" are anions which are not degraded to neutrality when the initially formed complex decomposes and are noninterfering with desired subsequent polymerizations.

Preferred metal complexes a1) used according to the present invention are complexes corresponding to the formula:

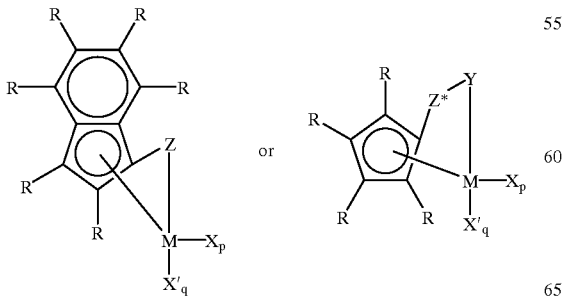

wherein:
R independently each occurrence is a group selected from hydrogen, hydrocarbyl, halohydrocarbyl, silyl, germyl and mixtures thereof, said group containing up to 20 nonhydrogen atoms;
M is titanium, zirconium or hafnium;
Z is a divalent moiety comprising boron, or a member of Group 14 of the Periodic Table of the Elements, and also comprising nitrogen, phosphorus, sulfur or oxygen, said moiety having up to 60 nonhydrogen atoms;
X and X' are as previously defined;
p is 0, 1 or 2; and
q is 0 or 1 ;
with the proviso that;
when p is 2, q is 0, M is in the +4 formal oxidation state, and X is an anionic ligand selected from the group consisting of halide, hydrocarbyl, hydrocarbyloxy, di(hydrocarbyl)arnido, di(hydrocarbyl)phosphido, hydrocarbylsulfido, and silyl groups, as well as halo-, di(hydrocarbyl)amino-, hydrocarbyloxy- and di(hydrocarbyl)phoshino-substituted derivatives thereof, said X group having up to 20 nonhydrogen atoms,
when p is 1, q is 0, M is in the +3 formal oxidation state, and X is a stabilizing anionic ligand group selected from the group consisting of allyl, 2-(N,N-dimethylaminomethyl)phenyl, and 2-(N,N-dimethyl) aminobenzyl, or M is in the +4 formal oxidation state, and X is a divalent derivative of a conjugated diene, M and X together forming a metallocyclopentene group, and
when p is 0, q is 1, M is in the +2 formal oxidation state, and X' is a neutral, conjugated or nonconjugated diene, optionally substituted with one or more hydrocarbyl groups, said X' having up to 40 carbon atoms and forming a π-complex with M.

More preferred coordination complexes a1) used according to the present invention are complexes corresponding to the formula:

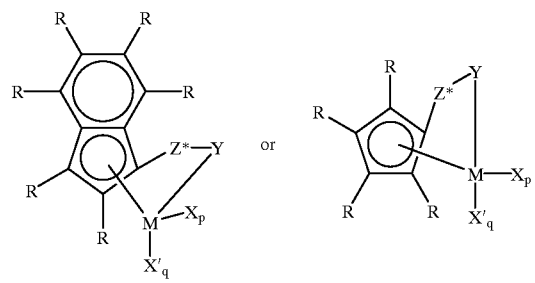

wherein
R independently each occurrence is hydrogen or $C_{1-6}$ alkyl;
M is titanium; Y is —O—, —S—, —NR*—, —PR*—;
Z* is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$;
R* each occurrence is independently hydrogen, or a member selected from hydrocarbyl, hydrocarbyloxy, silyl, halogenated alkyl, halogenated aryl, and combinations thereof, and R* having up to 20 nonhydrogen atoms, and optionally, two R* groups from Z (when R* is not hydrogen), or an R* group from Z and an R* group from Y form a ring system;

p is 0, 1 or 2;
q is 0 or 1;
with the proviso that:
when p is 2, q is 0, M is in the +4 formal oxidation state, and X is independently each occurrence methyl or benzyl,
when p is 1, q is 0, M is in the +3 formal oxidation state, and X is 2 (N,N-dimethyl)aminobenzyl); or M is in the +4 formal oxidation state and X is 1,4-butadienyl, and
when p is 0, q is 1, M is in the +2 formal oxidation state, and X' is 1,4-dipenyl-1,3-butadiene or 1,3-pentadiene, The latter diene is illustrative of unsymetrical diene groups that result in production of metal complexes that are actually mixtures of the respective geometrical isomers.

Exemplary constrained geometry metal complexes are described in International Patent Publication WO 97/26297, particularly at pages 25–28, which are incorporated herein by reference.

The complexes can be prepared by use of well known synthetic techniques. A preferred process for preparing the metal complexes is is disclosed in U.S. Pat. No. 5,491,246, the teachings of which are hereby incorporated by reference. The reactions are conducted in a suitable noninterfering solvent at a temperature from −100 to 300° C., preferably from −78 to 100° C., most preferably from 0 to 50° C. A reducing agent may be used to cause the metal M to be reduced from a higher to a lower oxidation state. Examples of suitable reducing agents are alkali metals, alkaline earth metals, aluminum and zinc, alloys of alkali metals or alkaline earch metals such as sodium/mercury amalgam and sodium/potassium alloy, sodium naphthalenide, potassium graphite, lithium alkyls, lithium or potassium alkadienyls, and Grignard reagents.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing are also suitable.

Suitable activating cocatalysts useful in combination with component a1) are those compounds capable of abstraction of an X substituent from a1) to form an inert, noninterfering counter ion, or that form a zwitterionic derivative of a1). Suitable activating cocatalysts for use herein include perfluorinated tri(aryl)boron compounds, and most especially tris(pentafluorophenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, and ferritenium salts of compatible, noncoordinating anions. Suitable activating techniques include the use of bulk electrolysis (explained in more detail hereinafter). A combination of the foregoing activating cocatalysts and techniques may be employed as well. The foregoing activating cocatalysts and activating techniques have been previously taught with respect to different metal complexes in the following references: U.S. Pat. No. 5,153,157, U.S. Pat. No. 5,064,802, U.S. Pat. No. 5,278,119, U.S. Pat. No. 5,407,884, U.S. Pat. No. 5,483,014, U.S. Pat. No. 5,321,106, and EP-A-520,732, the teachings of which are hereby incorporated by reference.

More particularly, suitable ion forming compounds useful as cocatalysts comprise a cation which is a Bronsted acid capable of donating a proton, and a compatible, noncoordinating anion, $A^-$.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known arid many, particularly such compounds containing a single boron atom in the anion portion, are available commercially. Preferably such cocatalysts may be represented by the following general formula:

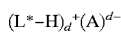

wherein:
L* is a neutral Lewis base;
$(L^*-H)^+$ is a Bronsted acid;
$A^{d-}$ is a noncoordinating, compatible anion having a charge of d−, and
d is an integer from 1–3.

More preferably $A^{d-}$ corresponds to the formula: $[M'Q_4]^-$;
wherein:
M' is boron or aluminum in the formal +3 formal oxidation state; and
Q independently each occurrence is selected from hydride, dialkylamido, halide, hydrocarbyl, hydrocarbyloxide, halosubstituted-hydrocarbyl, halosubstitutedhydrocarbyloxy, and halosubstituted silylhydrocarbyl radicals (including perhalogenated hydrocarbylperhalogenated hydrocarbyloxy- and perhalogenated silylhydrocarbyl radicals), said Q having up to 20 carbons with the proviso that in not more than one occurrence is Q halide.

Examples of suitable hydrocarbyloxide Q groups are disclosed in U.S. Pat. No. 5,296,433, the teachings of which are herein incorporated by reference.

In a more preferred embodiment, d is 1, that is, the counter ion has a single negative charge and is $A^-$. Activating cocatalysts comprising boron which are particularly useful in the preparation of catalysts of this invention may be represented by the following general formula:

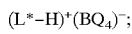

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Most preferably, each occurrence of Q is a fluorinated aryl group, especially, a pentafluorophenyl group.

Illustrative, but not limiting, examples of boron compounds which may be used as an activating cocatalyst in the preparation of the improved catalysts of this invention are trisubstituted ammonium salts such as:
trimethylammonium tetrakis(pentafluorophenyl) borate, triethylammonium
tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-dimethylanilinium n-butyltris(pentafluorophenyl) borate, N,N-dimethylanilinium benzyltris(pentafluorophenyl)borate, N,N-dimethylanilinium tetrakis(4-(t-butyldimethylsilyl)-2,3,5,6-tetrafluorophenyl) borate,
N,N-dimethylanilinium tetrakis(4-(triisopropysilyl)-2,3,5,6-tetrafluorophenyl) borate, N,N-dimethylanilinium pentafluorophenoxytris(pentafluorphenyl) borate,
N,N-diethylanilinium tetrakis(pentafluorphenyl) borate,
N,N-dimethyl-2,4,6-trimethylanilinium tetrakis (pentafluorophenyl)borate,
trimethylammonium tetrakis (2,3,4,6-tetrafluorophenyl) borate,
triethylammonium tetrakis (2,3,4,6-tetrafluorophenyl) borate,
tripropylammonium tetrakis (2,3,4,6-tetrafluorophcnyl) borate,
tri(n-butyl)ammonium tetrakis (2,3,4,6-tetrafluorophenyl) borate,
dimethyl(t-butyl)ammonium tetrakis (2,3,4,6-tetrafluorophenyl) borate,
N,N-dimethylanilinium tetrakis (2,3,4,6-tetrafluorophenyl) borate,
N,N-diethylanilinium tetrakis (2,3,4,6-tetrafluorophenyl) borate, and
N,N-dimenhyl-2,4,6-trimethylanilinium tetrakis (2,3,4,6-tetrafluorophenyl)
borate; disubstituted ammonium salts such as: di-(i-propyl) ammonium
tetrakis(pentafluorophenyl) borate, and dicyclohexylammonium
tetrakis(pentafluorophenyl) borate; trisubstituted phosphonium salts such as: triphenylphosphonium tetrakis (pentafluorophenyl) borate,
tri(o-tolyl)phosphonium tetrakis(pentafluorophenyl)borate, and
tri(2,6-dimethylphenyl)phosphonium tetrakis (pentafluorophenyl) borate;
disubstituted oxonium salts such as: diphenyloxonium tetrakis(pentafluorophenyl) borate,
di(o-tolyl)oxonium tetrakis(pentafluororphenyl) borate, and
di(2,6-dimethylphenyl) oxonium tetrakis (pentafluorophenyl) borate;
disubstituted sulfonium salts such as: diphenylsulfonium tetrakis(pentafluorophenyl) borate,
di(o-tolyl)sulfoniumtetrakis(pentafluorophenyl) borate, and
bis(2,6-dimethylphenyl)sulfonium tetrakis (pentafluorophenyl) borate Preferred $(L^*-H)^+$ cations are N,N-dimethylanilinium and tributylammonium.

Another suitable ion forming, activating cocatalyst comprises a salt of a cationic oxidizing agent and a noncoordinating, compatible anion represented by the formula:

$$(Ox^{e+})_d(A^{d-})_e.$$

wherein:
Ox$^{e+}$ is a cationic oxidizing agent having a charge of e+;
e is an integer from 1 to 3; and
$A^{d-}$ and d are as previously defined.

Examples of cationic oxidizing agents include: ferrocenium, hydrocarbyl-substituted ferrocenium, Ag$^+$ or Pb$^{+2}$. Preferred embodiments of $A^{d-}$ are those anions previously defined with respect to the Bronsted acid containing activating cocatalysts, especially tetrakis (pentafluorophenyl)borate.

Another suitable ion forming, activating cocatalyst comprises a compound which is a salt of a carbenium ion and a noncoordinating, compatible anion represented by the formula:

$$©^+A^-$$

wherein:
©$^+$ is a $C_{1-20}$ carbenium ion; and
$A^-$ is as previously defined.

A preferred carbenium ion is the trityl cation, i.e. triphenylmethylium.

A further suitable ion forming, activating cocatalyst comprises a compound which is a salt of a silylium ion and a noncoordinating, compatible anion represented by the formula:

$$R'''_3Si^*A^-$$

wherein:
R''' is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof.

Silylium salts have been previously generically disclosed in *J. Chem Soc. Chem. Comm.* 1993, 383–384, as well as Lambert, J. B., et al, *Organometallics*, 1994, 13, 2430–2443. The use of the above silylium salts as activating cocatalysts for addition polymerization catalysts is disclosed in U.S. Pat. No. 5,625,087, which is incorporated herein by reference.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433, the teachings of which are herein incorporated by reference.

The technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are (i) liquids under the conditions of the electrolysis (generally temperatures from 0 to 100° C.), (ii) capable of dissolving the supporting electrolyte, and (iii) inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include diduorobenzene (all isomers), dimethoxyetllane (DME), and mixtures thereof.

The electrolysis may be conducted in a standard electrolytic cell containing an anode and cathode (also referred to as the working electrode auld counterelectrode respectively). Suitable materials of construction for the cell are glass, plastic, ceramic and glass-coated metal. The electrodes are prepared from inert conductive materials, by which are meant conductive materials that are unaffected by the reaction mixture or reaction conditions. Platinum or palladium are preferred inert conductive materials. Normally an ion permeable membrane such as a fine glass grit separates the cell into separate compartments, the working electrode compartment and counterelectrode compartment. The working electrode is immersed in a reaction medium comprising the metal complex to be activated, solvent, supporting electrolyte, and any other materials desired for moderating the electrolysis or stabilizing the resulting complex. The counterelectrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and a compatible, noncoordinating anion, $A^-$. Preferred supporting electrolytes are salts corresponding to the formula $G^+A^-$ wherein $G^+$ is a cation which is nonreactive towards the starting and resulting complex, and $A^-$ is as previously defined.

Examples of cations, $G^+$, include tetrahydrocarbyl substituted ammonium or phosphonium cations having up to 40 nonhydrogen atoms. Preferred cations are the tetra(n-butyl) ammonium and tetra(ethyl)ammonium cations.

During activation of the complexes of the present invention by bulk electrolysis, the cation of the supporting electrolyte passes to the counterelectrode and $A^-$ migrates to the working electrode to become the anion of the resulting oxidized product. Either the solvent or the cation of the supporting electrolyte is reduced at the counterelectrode in equal molar quantity with the amount of oxidized metal complex formed at the working electrode. Preferred supporting electrolytes are tetrahydrocarbylammonium salts of tetrakis(perfluoroaryl) borates having from 1 to 10 carbons in each hydrocarbyl or perfluoroaryl group, especially tetra(n-butylammonium)tetrakis{pentafluorophenyl) borate.

A further recently discovered electrochemical technique for generation of activating cocatalysts is the electrolysis of a disilane compound in the presence of a source of a noncoordinating compatible anion. All of the foregoing techniques are more fully disclosed and claimed in published international patent application WO 95/00683. In as much as the activation technique ultimately produces a cationic metal complex, the amount of such resulting complex formed during the process can be readily determined by measuring the quantity of energy used to form the activated complex in the process.

Alumoxanes, especially methylalumoxane or triisobutylaluminum modified methylalumoxane are also suitable activators and may be used for activating the metal complexes.

A most preferred activating cocatalyst is trispentafluorophenylborane.

The molar ratio of metal complex: activating cocatalyst employed preferably ranges from 1:1000 to 2:1, more preferably from 1:5 to 1.5:1, most preferably from 1:2 to 1:1.

In general, the polymerization may be accomplished at conditions well known in the prior art for Ziegler-Natta or Kaminsky Sinn type polymerization reactions, that is, temperatures from 0 to 250° C. and pressures from atmospheric to 1000 atmospheres (100 MPa). Suspension, solution, slurry, gas phase or other polymerization process conditions may be employed if desired, however, solution polymerization process conditions, especially continuous solution polymerization process conditions, are preferred. A support may be employed but preferably the catalysts are used in a homogeneous manner, ie dissolved in the solvent. Of course, the active catalyst system can form in sitti if the catalyst and its cocatalyst components are added directly to the polymerization process and a suitable solvent or diluent (e.g. hexane, iso-octane, etc.) including condensed monomer, are also used. Preferably the active catalyst is formed separately in a suitable solvent, e.g. in a slip stream, prior to adding it to the polymerization mixture.

As previously mentioned, the above catalyst system is particularly useful in the preparation of elastomeric polymers in high yield and productivity. The process employed may be either a solution or slurry process both of which are previously known in the art. Kaminsky, *J. Poly. Sci.*, Vol. 23, pp. 2151–64 (1985) reports the use of a soluble bis (cyclopentadienyl) zirconium dimethyl-alumoxane catalyst system for solution polymerization of EPDM elastomers. U.S. Pat. No. 5,229,478 discloses a slurry polymerization process utilizing similar bis(cyclopentadienyl) zirconium based catalyst systems. In general, it is desirable to produce the elastomers for use in the present invention under conditions of increased reactivity of the diene monomer component.

Advantageously, a single site catalyst, e.g. a monocyclopentadienyl or -indenyl metallocene, is chosen that allows for increased diene reactivity which results in the preparation of ethylene/α-olefin/diene polymers in high yield. For example, the monocyclopentadienyl and indenyl metallocene catalysts, described previously, perform well in this respect. Additionally, these catalyst systems achieve the economical production of fast curing ethylene/α-olefin/diene polymers with diene contents of up to 20 weight percent.

Preferred ethylene/α-olefin/diene polymer products are made with a catalyst that is free of aluminum (the presence of which has a detrimental effect on certain of the product physical properties, e.g. color). Moreover, due to the high efficiency of these aluminum-free catalysts, less is required and since less is required, less catalyst residue is present in the final product. In fact so little catalyst residue is present in the final product that the process of these embodiments does not require a catalyst residue removal or treatment step as is required in conventional processes. The ethylene/(α-olefin/diene polymer products made using such catalysts are also substantially free of color bodies.

Another aspect of the present invention is a process for fabricating the polymer mixture of the invention into the form of an article. Fabricated articles may be made from ethylene/α-olefin/diene polymer modified according to this invention using any conventional EPDM processing technique. The process can include a lamination and coextrusion technique or combinations thereof, or using the polymer mixture alone, and includes a blown film, cast film, extrusion coating, injection molding, blow molding, compression molding, rotomolding, or injection blow molding operation or combinations thereof, calendering, sheet extrusion, profile extrusion to make a film, a molded article or an article comprising an ethylene/α-olefin/diene polymer film layer or coating and extrusion, injection molding, etc., of the modified elastomer with a blowing agent to make an article comprising foam rubber.

The new polymers described herein are particularly useful for wire and cable coating operations, as well as in sheet extrusion for vacuum forming operations.

Modification of the selected polymer according to this invention involves partially crosslinking the selected ethylene/α-olefin/diene polymer to make a modified ethylene/α-olefin/diene polymer satisfying the following equations:

$$W \leq \left(\frac{MS_2 - MS_1}{MS_1}\right)$$

wherein $MS_1$, $MS_2$, and W are measured as defined above. The Mooney viscosity for the elastomers after modification according to this invention preferably ranges from a minimum of about 10, more preferably at least about 15, even more preferably at least about 20, and even more preferably about 30, up to a maximum viscosity of about 100, more preferably up to about 80 and even more preferably up to about 70. Preferably, $MS_1$ is preferably not greater than 20, $MS_2$ is preferably at least 80, and W is preferably about 0.5, more preferably about 0.7, more preferably about 0.8, even more preferably about 5.0, even more preferably about 7.0 and even more preferably about 8.0.

The % gel of the modified polymer is preferably less than or equal to 60%, more preferably less than 30%, more preferably less than 20%., even more preferably less than 10% and even more preferably less than 5%. The modified polymer preferably has a percent gel that is preferably not more than about 20 percent greater, more preferably not more than about 10 percent greater, than the percent gel of the unmodified polymer selected in step (A).

The rheology of the above polymers is preferably modified to satisfy the equation:

$$MS_2 \geq \left(\frac{MV}{X} + \frac{\% \text{ gel}}{Y}\right)Z$$

in which X is 50, preferably 45, Y is 20, more preferably 10 and even more preferably 5, and Z is 40, more preferably 50, and even more preferably 55, and $MS_2$, MV and % gel, including their preferred ranges, are as defined above.

Crosslinking agents include peroxide compounds and other known heat-activated curing agents, such as azo compounds, and electron beam, gamma-ray and other known radiation cure systems. If the crosslinking agent is a heat-activated substance, e.g. a peroxide, etc., then this agent is melt processed with the ethylene/α-olefin/diene polymer to modify the same according to this invention. The various crosslinking agents can be used alone or in combination with one another. Excess or residual peroxide may be available for initiating crosslinking along with another crosslinking agent, electron beam, etc., to further crosslink the ethylene polymer after production of a crosslinked molded article having greater than 30 wt %, preferably at least 60 wt %, even more preferably at least 70 wt %, gel up to 100 wt % gel.

Suitable heat-activated crosslinking agents include free radical initiators, preferably organic peroxides, more preferably those with one hour half lives at temperatures greater than 120 C. The free radical initiators can be selected from a variety of known free radical initiators such as peroxides (e.g., di-t-butyl peroxide (available from Elf Atochem), VULCUP™ (a series of vulcanizing and polymerization agents containing α,α'-bis(t-butylperoxy)-diisopropylbenzene made by Hercules, Inc.), DI-CUP™ (a series of vulcanizing and polymerization agents containing dicumyl peroxide made by Hercules, Inc.), LUPERSOL™ 101 (2,5-dimethyl-2,5-di(t-butylperoxy)hexene), LUPERSOL™ 130 (2,5-dimethyl-2,5-di(t-butylperoxy)hexyne-3), LUPERSOL™ 575 (t-amyl peroxy-2-ethylhexonate) (all LUPERSOL™ peroxides are commercially available from Elf Atochem, North America) or TRIGONOX™ (an organic peroxide made by Noury Chemical Company)) or radiation treatment (γ, β, or α, including electron beam irradiation).

In one embodiment, a heat-activated compound, such as a peroxide-containing compound, may be used as the crosslinking agent. The polymer is treated with heat-activated crosslinking agent in the amount required to cause modification of the melt strength of the polymer in accordance with the conditions specified above. When the crosslinking agent is a peroxide compound, the amount of peroxide compound is preferably in the range from a minimum of at least about 0.01 mmoles, preferably at least about 0.04 mmoles, up to a maximum of about 0.8 mmoles, preferably up to about 0.2 mmoles, peroxide radical/kg ethylene/α-olefin/diene polymer. The crosslinking agent concentration required to modify a particular polymer depends on the susceptibility of the polymer to crosslinking and is influenced by factors such as its percentage vinyl unsaturation and the amount of chain branching, especially short chain branching.

The formulations are compounded by any convenient method, including dry blending the individual components and subsequently melt mixing or melt processing, spraying the heat-activated crosslinking agent onto solid polymer pellets and subsequently melt mixing or melt processing or by pre-melt mixing in a separate device (e.g., a Banbury mixer, a Haake mixer, a Brabender internal mixer, or a single screw or twin screw extruder). Compounding with a twin screw extruder, such as model ZSK-53 made by Werner and Pfleiderer, is preferred, but other extruder configurations may be used such as those disclosed in U.S. Pat. No. 5,346,963, which is incorporated herein by reference.

When the crosslinking agent is radiation, the absorbed dose of radiation is preferably in the range from about 1 to about 20 gray (Joules of absorbed radiation energy/kg of ethylene/α-olefin/diene polymer). Similar to the case with heat-activated crosslinking agents, the dosage required to modify a particular polymer depends on the susceptibility of the polymer to crosslinking and is generally influenced by the same factors. The radiation is preferably applied in a wavelength range from about 0.01 to about $1 \times 10^{-5}$ nanometers (nm).

The irradiation conditions are preferably adjusted to avoid unwanted side effects. The irradiation intensity is, for example, preferably adjusted to avoid substantial heating of the polymer, because that might cause the polymer to react with oxygen in the air and with oxygen dissolved in the polymer, which in turn could cause polymer degradation, resulting in reduction of long-term stability and/or an increased potential to form gels, unless additional measures are taken to prevent contact with oxygen. Excessive heating would also risk fusing discrete polymer particles or pellets together, making it inconvenient to use with conventional melt processing equipment. These side effects may be avoided by adjusting the radiation dosage rate and/or conducting the process in an inert atmosphere. Adjusting the radiation dosage rate is, from a practical standpoint, preferable. The radiation dosage rate is preferably less than 20

Mrad/s, more preferably less than 10 Mrad/s, and even more preferably less than 7 Mrads/s.

The crosslinking agent treatment may be carried out online. Online crosslinking agent treatment is carried out on the polymer as the polymer is produced, preferably immediately after polymerization and devolatilization and prior to first solidification of the polymer (typically by pelletization). When the crosslinking agent is a heat-activated compound, the compound may be added with a solvent or as a concentrate in a masterbatch.

Modification according to this invention may also be carried out offline. Offline modification may be carried out by treating an unmodified polymer with crosslinking agent after it has been solidified (typically as pellets or granules). When the crosslinking agent is radiating energy, the polymer may be treated by exposing the polymer, preferably as a solid, to the radiating energy under conditions which allow for control of the amount of energy absorbed by the polymer. When the crosslinking agent is a heat-activated compound as described above, it is either admixed with or coated on the polymer pellets or granules and then the polymer pellets or granules are melt processed or it is added to the polymer, directly or preferably in the form of a concentrate or masterbatch, during melt processing such as through one of the ports for adding components to the melt often provided on melt processing equipment.

A rheology-modified polymer according to this invention may be combined with one or more additional polymers to form polymer mixtures. The additional polymers may be rheology-modified or unmodified. They may be selected from any of the modified polymers and from the unmodified polymers described above that serve as starting materials for modification according to this invention. The additional polymers may also be heterogeneously branched polymers such as low density polyethylene (LDPE), linear low density polyethylene polymers (LLDPE), substantially linear ethylene polymers (SLEP), and/or high density ethylene polymers (HDPE). Any of the aforementioned additional polymers may be grafted or copolymerized with various functional groups.

The polymer mixtures of the present invention may be prepared by physical blending of those polymers in an appropriate mixer and/or extruder, by combining the flow of two or more reactors used to make those polymers connected in series or in parallel, and/or by in-reactor blending using two or more catalysts in a single reactor or combinations of multiple catalysts and multiple reactors. The general principle of making polymer blends by in-reactor blending using two or more catalysts in a single reactor or combinations of multiple catalysts and multiple reactors is described in WO 93/13143; WO 94/01052; EP-A-619827; and U.S. Pat. No. 3,914,342, each of which are incorporated herein by reference. The polymer mixtures can be prepared by selecting appropriate catalyst and process conditions with a view to the final composition characteristics and conducting the rheology modification step either online as the polymers are blended or offline after such blending step.

The present invention also encompasses intermediates for making modified polymers according to this invention, which may be melt processed into the finished article alone or in combination with the other polymers described above. Such intermediates include pellets and granules comprising the selected polymer crosslinked with radiation or heat-activated compound as described. The intermediates may also be pellets or granules comprising the selected polymer that have been sprayed, coated in some other way, or admixed with unreacted heat-artivated crosslinking agent, such as a peroxide compound or an azo compound. The heat-activated compound may be applied neat, with an adjuvant or with a substance that retards the reactivity of the heat-activated compound at temperatures below the intended melt processing temperature. The pellets or granules treated with the heat-activated compound may be further treated to seal the heat-activated compound onto the surface of the pellets or granules, if necessary.

Modification according to this invention may be carried out using polymer that contains little or no secondary antioxidant. This may be preferred in cases in which the polymer will undergo further processing in which the manufacturer customizes the polymer with its own additive package which includes one or more antioxidants. This may in some instances also be preferred from a cost and polymer color standpoint, since some antioxidants may react with the crosslinking agent, using up some of the antioxidant intended to protect the polymer against oxidation and possibly forming colored byproducts.

This invention also encompasses the products made by all the foregoing processes.

This invention is further described by the examples below. Those examples are provided for illustration only and are not to be construed as limiting the scope of the invention described more fully herein.

EXAMPLES

Process Description
Rheoloqy Modification

Examples 1–4 are viscosity modified on Haake Rheocord 40 torque rheometer drive unit and Rheomix 3000E mixer (available from Haake Buchler Instruments) equipped with roller style blades.

Examples 5, 6 and 7 are viscosity modified on a Haake Rheocord 40 torque rheometer drive unit fitted with a Rheomix 202 ¾ inch single screw extruder.

Examples 8, 9 and 10 are viscosity modified on a 1.5 inch diameter Killion single screw extruder.

Base Resins

TABLE I

Characteristics of Base Resins

| Characteristic | EPDM Base Resin | | | | | | | | |
|---|---|---|---|---|---|---|---|---|---|
| | 1 | 2 | 3 | 4 | 5 | 6 | 7 | 8 | 9 |
| Melt Index ($I_2$ at 190 C) | .41 | 4.8 | 19.2 | 0.5 | 0.6 | 1.1 | — | — | — |
| Melt Index Ratio ($I_{10}/I_2$ at 190 C) | 7.3 | 6.1 | 6.0 | 7.0 | — | — | — | — | — |
| Mooney Viscosity (ML 1 + 4 at 125 C) | 35 | 7 | 2 | 35 | 25 | 18 | 18 | 30 | 41 |
| Wt. % Ethylene Monomer | 72 | 74 | 73 | 51 | 70 | 72 | 72 | 71 | 55 |
| Wt % Propylene Monomer | 23 | 21 | 22 | 44 | 25 | 23 | 23 | 23 | 41 |
| Wt % ENB Monomer | 5 | 5 | 5 | 5 | 5 | 5 | 5 | 5 | 5 |
| Type* | SC | SC | SC | A | SC | SC | SC | SC | A |

* "SC" means "semi-crystalline" and "A" means "amorphous"

The additive package for EPDM Base Resins 5, 6 and 7 is 1250 ppm calcium stearate, 1000 ppm Irganox 1076 and about 1600 ppm Sandostab PEPQ.

Crosslinking Agents

The peroxide used for examples 1–4 and 6–7 is 2,5 dimethyl-2,4 di(t-butyl peroxy)-3-hexyne (available commercially as Lupersol™ 130)

The peroxide used for examples 5 and 8–10 is 2,5 dimethyl-2,4 di(t-butyl peroxy)-3-hexane (available commercially as Lupersol™ 101)

Formulation Ingredients

TABLE 2

Key to Formulation Ingredients

| Chemical | Supplier | Composition |
| --- | --- | --- |
| Calsol 8240 (aka Circosol 4240) | Sun Process Oils | ASTM Type 3 Untreated napthenic oil |
| Captax (MTB) | R.T. Vanderbilt Co. Inc. | 2-mercapto-benzothiazole |
| Carbon Black N330 | Cabot Corporation | Carbon Black |
| Methyl Tuads (TMTD) | R.T. Vanderbilt Co. Inc. | Tetramethylthiuram disulfide |
| Stearic Acid | C.P. Hail | Stearic Acid |
| Sulfur | R.E. Carrol | Sulfur |
| Zinc Oxide (Kadox 72) | Zinc Corporation of America | Zinc Oxide Powder |

Method of Preparing Samples

Rheology Modification

Examples 1–4 are prepared by loading the starting elastomer into the mixer at 160 degree C. and 30 rpm mixing speed. The loading ram is lowered to force the sample into the mixer and the ram is kept down throughout the run (except during addition of the peroxide) to minimize exposure to air. After the elastomer is loaded, the ram is raised and the liquid peroxide is slowly added using a syringe to direct the peroxide onto the fluxing polymer nip (avoiding the metal surfaces which can cause volatilization of the peroxide). The weight of peroxide is calculated from the weight loss of the syringe. After approximately 3 minutes, the temperature is increased to 190 C to decompose the peroxide. The run is continued until the torque reaches a plateau for 2–5 minutes, indicating completion of the rheology modification reaction.

Total mixing time is approximately 15–20 minutes. The sample is removed from the mixer and cooled, and then granulated using a low speed Colortronic granulator.

Examples 5–7 are prepared by imbibing the elastomer with peroxide solution, extruding at low temperature to ensure mixing/homogenization and then extruding at high temperature to perform the rheology modification reaction. Thus, the samples described are produced by placing 227 grams of EPDM in a gallon HDPE jar which contains ½" stainless steel ball bearings to keep the polymer from agglomerating, adding peroxide along with 15–20 grams of methyl ethyl ketone, and then roll blending for to 16 hours. The pellets are then dried at conditions to remove the methyl ethyl ketone but not to devolatilize the peroxide. The imbibed pellets are then extruded at 110 C, granulated, then extruded again at 200 C.

Examples 8–9 are prepared by imbibing the elastomer with peroxide solution, extruding at low temperature to ensure mixing and then extruding at high temperature to perform the rheology modification reaction. The imbibing process involves placing the pellets inside a 150 lb. HDPE drum. One inch stainless steel ball bearings are added to keep the polymer from agglomerating. The peroxide is then diluted with methyl ethyl ketone (MEK) and that solution is quickly poured over the pellets (the amount of MEK is typically 3–5 wt.%). The lid is then closed and the drum tumbled end over end for 4 to 16 hours. The pellets, ball bearings and imbibed pellets are then poured out on a HDPE film for the MEK to evaporate. The first extrusion step ("homogenizing") is accomplished by extruding at 295 F while the extruder is run at 25–45 rpm. The second step ("reacting") is accomplished at 410 F at an extruder speed of 25 rpm.

Example 10 is prepared by imbibing the elastomer with peroxide solution, extruding at low temperature to ensure mixing and then extruding at high temperature to perform the rheology modification reaction according to the same procedure as used for examples 8 and 9, except that when the pellets, ball bearings and imbibed pellets are poured out on a HDPE film for the MEK to evaporate, this material is reground and then dried by blowing chilled air across the pellets on the HDPE film to reduce reagglomeration. The product is also chilled before the second extrusion step to eliminate clumping.

Formulating

The elastomer formulations for Examples 1, 2 and 3 are prepared with a Haake Rheomix 3000 mixer as described above and then roll milled for melt stength testing as described below.

Formulations

Examples 1–3 are formulated according to ASTM D-3568 #2 as follows:

35.21 wt. % resin
0.35 wt. % stearic acid
1.76 wt. % Kadox 72 Zinc Oxide
35.21 wt. % Carbon Black N330
26.41 wt. % Circosol 4240
0.18 wt. % Captax (MTB)
0.35 wt. % Methyl Tuads (TMTD)
0.53 wt. % Sulfur.

Examples 8–10 are formulated according to ASTM 3865 as follows:

41.84 wt. % resin
0.42 wt. % stearic acid
2.09 wt. % Kadox 72 Zinc Oxide
33.47 wt. % Carbon Black
20.92 wt. % Calsol 8240
0.21 wt. % Captax (MTB)
0.42 wt. % Methyl Tuads (TMTD)
0.63 wt. % Sulfur.

Analysis of Products

Melt Index

According to ASTM at 190 degree C.

Mooney

The data is gathered on a Monsanto MV2000E viscometer at 125 degree C. using the large rotor size and reading the viscosity at 5 minutes (ML 1+4).

Melt Strength

Melt strength was measured on a Goettfert Rheotens. The Rheotens measures the melt strength as well as the tensile force/velocity. The melt strength is taken as the plateau of the force velocity curve. When to testing approximately 10 grams of formulated material is placed in the capillary rheometer at the correct temperature. The extrudate from the rheometer is positioned between the two rotating wheels of the Rheotens which are placed close together so the extrudate is drawn through the wheels. The wheels are accelerated at 2.4 m/s$^2$, and the force is measured as the function of the velocity of the wheels. Eventually, the extrudate breaks and the test is terminated. Conditions for testing are 2.1 mm diameter die, 42 mm length, aspect ratio of 20.0, crosshead speed of 25.4 mm/min, shear rate of 33 reciprocal seconds, air gap between the rheometer outlet and the Rheotens is 100 mm and initial wheel velocity is 10 mm/sec. All tests are run at 110 C to avoid vulcanization of the formulation.

Percent Gel

The amount of gel was determined by pressing small samples (2–3 grams) approximately 2 mil films and then performing a xylene extraction according to ASTM conditions with the exception that instead of grinding the polymer to a powder as is done with polyethylene the thin films are used directly (Wiley mill creates too much heat).

Example 1

| Results with Base Resin 1 | | | |
|---|---|---|---|
| Mooney Viscosity at 125 C. | Percent Peroxide (wt. %) | Gel (wt. %) | Melt Strength (cN) |
| 35 | 0.000 | 0.2 | 21.1 |
| 43 | 0.030 | 1.0 | 37.6 |
| 43 | 0.046 | 1.0 | 38.6 |
| 54 | 0.063 | 0.5 | 85.4 |
| 67 | 0.087 | 9.8 | 84.1 |
| 88 | 0.124 | 19.4 | 15.8 |

Example 2

| Results with Base Resin 2 | | | |
|---|---|---|---|
| Mooney Viscosity at 125 C. | Percent Peroxide (wt. %) | Gel (wt. %) | Melt Strength (cN) |
| 7 | 0.000 | 0.3 | 5.1 |
| 22 | 0.136 | 0.3 | 16.3 |
| 37 | 0.157 | 2.4 | 76.5 |
| 55 | 0.197 | 29.8 | 111.6 |
| 50 | 0.266 | 30.2 | 70.2 |

Example 3

| Results with Base Resin 3 | | | |
|---|---|---|---|
| Mooney Viscosity at 125 C. | Percent Peroxide (wt. %) | Gel (wt. %) | Melt Strength (cN) |
| 2 | 0.000 | 0.3 | 0 |
| 15 | 0.241 | 0.9 | 10.8 |
| 28 | 0.299 | 31.0 | 40.8 |
| 31 | 0.352 | 29.4 | 78.5 |
| 50 | 0.550 | 52.5 | 66.5 |

Example 4

| Results with Base Resin 4 | |
|---|---|
| Mooney Viscosity at 125 C. | Percent Peroxide (wt %) |
| 35 | 0.000 |
| 38 | 0.067 |
| 43 | 0.071 |
| 47 | 0.076 |
| 57 | 0.090 |
| 64 | 0.108 |
| 71 | 0.131 |

Example 5

| Results with Base Resin 6, Run #1 | |
|---|---|
| Mooney Viscosity at 125 C. | Percent Peroxide (wt %) |
| 18.5 | 0.000 |
| 41 | 0.085 |
| 60 | 0.112 |
| 73 | 0.133 |

Example 6

| Results with Base Resin 6, Run #2 | |
|---|---|
| Mooney Viscosity at 125 C | Percent Peroxide (wt %) |
| 18.5 | 0.000 |
| 30 | 0.050 |
| 30 | 0.061 |
| 38 | 0.092 |
| 42 | 0.106 |

Example 7

| Results with Base Resin 5 | |
|---|---|
| Mooney Viscosity at 125 C. | Percent Peroxide (wt %) |
| 25 | 0.000 |
| 46 | 0.067 |
| 58 | 0.071 |

Example 8

Results with Base Resin 7

| Mooney Viscosity at 125 C. | Percent Peroxide (wt %) | Gel (wt %) |
|---|---|---|
| 18.5 | 0.000 | — |
| 33.8 | 0.062 | — |
| 42.4 | 0.101 | — |
| 50.9 | 0.106 | 0.28 |
| 50.8 | 0.110 | 0.35 |

Example 9

Results with Base Resin 8

| Mooney Viscosity at 125 C. | Percent Peroxide (wt %) | Gel (wt %) |
|---|---|---|
| 29.6 | 0.000 | — |
| 51.9 | 0.060 | 0.00 |
| 53.8 | 0.068 | 0.47 |
| 50.0 | 0.080 | 0.34 |
| 56.5 | 0.096 | — |
| 69.3 | 0.106 | — |

Example 10

Results with Base Resin 9

| Mooney Viscosity at 125 C | Percent Peroxide (wt %) |
|---|---|
| 19 | 0.000 |
| 39.5 | 0.075 |
| 40.0 | 0.075 |
| 40.6 | 0.076 |

As can be seen from the foregoing examples, this invention may be applied to improve the green strength of a wide range of ethylene/(α-olefin/diene polymers selected according to this invention while maintaining good processability. Melt strength data for Examples 1–3, especially Examples 1 and 2, show in particular that melt strength can be substantially improved according to this invention without either a substantial increase in viscosity or substantial formation of gel.

Although the invention has been described in considerable detail through the preceding specific embodiments, it is to be understood that these embodiments are for purposes of illustration only. Many variations and modifications can be made by one skilled in the art without departing from spirit and scope of the invention. in the art without departing from the spirit and scope of the invention.

What is claimed is:

1. A process for improving the green strength of ethylene/α-olefin/diene polymers comprising:
   (A) selecting an ethylene/α-olefin/diene polymer having a Mooney ML1+4 viscosity, measured according to ASTM D 1646 at 125 C up to about 80 and a percent gel, measured according to ASTM D2765, Procedure A, up to about 30 percent and
   (B) partially crosslinking the ethylene/α-olefin/diene polymer selected in step (A) to make a modified ethylene/α-olefin/diene polymer satisfying the following equations:

$$W \leq \left(\frac{MS_2 - MS_1}{MS_1}\right)$$

wherein MV is the Mooney viscosity of the modified polymer measured as defined in step (A), $MS_1$ is the melt strength in centiNewtons of the polymer selected in step (A) when formulated according to ASTM D3568#2, $MS_2$ is the melt strength in centiNewtons of the modified polymer also when formulated according to ASTM D3568#2, and W is 0.3.

2. The process of claim 1 wherein the modified polymer further satisfies the equation:

$$MS_2 \geq \left(\frac{MV}{X} + \frac{\% \text{ gel}}{Y}\right)Z$$

wherein $MS_2$, MV and % gel are the melt strength, Mooney viscosity and percent gel of the modified polymer measured as previously defined and variables X, Y, and Z are 50, 20 and 40, respectively.

3. The process of claim 1 wherein W is 5.0.
4. The process of claim 1 wherein $MS_2 \geq 80$.
5. The process of claim 1 wherein the modified polymer has a percent gel no more than 10 percent greater than the percent gel of the polymer selected in step (A).
6. The process of claim 1 wherein the α-olefin is propylene and the diene is 5-ethylidene-2-norbornene.
7. The process of claim 1 wherein the polymer selected in step (A) has a melt index ratio ($I_{10}/I_2$@190 C) of less than about 10.
8. The process of claim 1 wherein the partial crosslinking is carried out by contacting the polymer selected in step (A) with a peroxide crosslinking agent under melt processing conditions.
9. The process of claim 1 wherein the partial crosslinking is carried out by exposing the polymer selected in step (A) to radiation having a wavelength less than 0.01 nanometers at an intensity sufficient to generate free radicals in the selected polymer.
10. The process of claim 2 wherein W is 5.0, $MS_2 \geq 80$ and the modified polymer has a percent gel no more than 10 percent greater than the percent gel of the polymer selected in step (A).

* * * * *